United States Patent
Fukaya

(10) Patent No.: US 11,091,147 B2
(45) Date of Patent: Aug. 17, 2021

(54) MOTOR SYSTEM AND CONTROL METHOD FOR MOTOR SYSTEM

(71) Applicant: TOYOTA JIDOSHA KABUSHIKI KAISHA, Toyota (JP)

(72) Inventor: Takashi Fukaya, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 16/270,650

(22) Filed: Feb. 8, 2019

(65) Prior Publication Data

US 2019/0248363 A1 Aug. 15, 2019

(30) Foreign Application Priority Data

Feb. 14, 2018 (JP) ............................. JP2018-023685

(51) Int. Cl.
| | |
|---|---|
| *B60W 20/50* | (2016.01) |
| *B60W 50/035* | (2012.01) |
| *B60W 10/08* | (2006.01) |
| *B60W 10/06* | (2006.01) |

(52) U.S. Cl.
CPC ............ *B60W 20/50* (2013.01); *B60W 10/06* (2013.01); *B60W 10/08* (2013.01); *B60W 50/035* (2013.01)

(58) Field of Classification Search
CPC .... B60W 20/50; B60W 50/035; B60W 10/08; B60W 10/06; B60W 2050/0006; B60W 2050/0045; B60W 2710/083; B60W 2050/0292; B60W 50/023; Y02T 10/72; H02P 31/00; B60L 15/00
See application file for complete search history.

(56) References Cited

U.S. PATENT DOCUMENTS

2004/0027076 A1* 2/2004 Shimizu .................... B60L 3/04
318/55

FOREIGN PATENT DOCUMENTS

| JP | 11-053207 A | 2/1999 |
|---|---|---|
| JP | 2009-259040 A | 11/2009 |
| JP | 2010-166635 A | 7/2010 |
| JP | 2016-030510 A | 3/2016 |

\* cited by examiner

*Primary Examiner* — Michael V Kerrigan
(74) *Attorney, Agent, or Firm* — Sughrue Mion, PLLC

(57) ABSTRACT

A motor system includes a motor, a first electronic control unit, a second electronic control unit, a first communication line, and a second communication line. The first electronic control unit transmits first data of the control command to the second electronic control unit via the first communication line when an abnormality has not occurred in the first communication line. The second electronic control unit controls the motor based on the first data after the first data has been received from the first electronic control unit. The first electronic control unit generates second data and to transmit the second data to the second electronic control unit via the second communication line when an abnormality has occurred in the first communication line. The second electronic control unit controls the motor based on the second data after the second data has been received from the first electronic control unit.

6 Claims, 8 Drawing Sheets

MOTOR SYSTEM AND CONTROL METHOD FOR MOTOR SYSTEM

INCORPORATION BY REFERENCE

The disclosure of Japanese Patent Application No. 2018-023685 filed on Feb. 14, 2018 including the specification, drawings and abstract is incorporated herein by reference in its entirety.

BACKGROUND

1. Technical Field

The disclosure relates to a motor system and a control method for a motor system.

2. Description of Related Art

A controller for a motor including a first electronic control unit that generates a control command for the motor and a second electronic control unit that is connected to the first electronic control unit via a communication line and controls the motor based on a control command from the first electronic control unit was proposed (for example, see Japanese Unexamined Patent Application Publication No. 2016-30510 (JP 2016-30510 A)). Here, the first electronic control unit and the second electronic control unit are connected to each other via a CAN bus of a power train system. In such a controller, when an abnormality has occurred in the communication line connecting the first electronic control unit to the second electronic control unit, the second electronic control unit independently generates a control command for the motor and controls the motor.

SUMMARY

In such a controller for a motor, when an abnormality has occurred in a communication line (a dedicated line) connecting the first electronic control unit to the second electronic control unit, there is demand for construction of a scheme of transmitting data from the first electronic control unit to the second electronic control unit via the CAN bus and causing the second electronic control unit to control the motor based on the data. Since a variety of data is transmitted between a plurality of control units including the first electronic control unit and the second electronic control unit via the CAN bus and thus a load of the bus is likely to become higher in comparison with a dedicated line, a data volume transmittable is generally limited. Accordingly, how to construct such a scheme is important.

A motor system and a control method for the motor system according to the disclosure enable control of a motor accompanied by communication between a first electronic control unit and a second electronic control unit even when a data volume which is transmittable from the first electronic control unit that generates a control command for the motor and the second electronic control unit that controls the motor is limited.

A motor system and a control method for the motor system according to the disclosure employ the following means.

A first aspect of the disclosure is a motor system. The motor system includes a motor, a first electronic control unit, a second electronic control unit, a first communication line, and a second communication line. The first electronic control unit is configured to generate a control command for the motor. The second electronic control unit is configured to communicate with the first electronic control unit and to control the motor. The first communication line connects the first electronic control unit to the second electronic control unit. The second communication line connects the first electronic control unit and the second electronic control unit to at least one third electronic control unit. The first electronic control unit is configured to transmit first data of the control command to the second electronic control unit via the first communication line when an abnormality has not occurred in the first communication line. The second electronic control unit is configured to control the motor based on the first data after the first data has been received from the first electronic control unit. The first electronic control unit is configured to generate second data based on the control command and to transmit the second data to the second electronic control unit via the second communication line when the abnormality has occurred in the first communication line. A data volume of the second data is less than a data volume of the first data. The second electronic control unit is configured to control the motor based on the second data after the second data has been received from the first electronic control unit.

With this configuration, since the second communication line is connected to at least one third electronic control unit in addition to the first electronic control unit and the second electronic control unit and a load thereof is likely to become higher than that of the first communication line, a data volume transmittable is generally limited. Accordingly, by causing the first electronic control unit to generate second data based on the control command and to transmit the second data to the second electronic control unit via the second communication line and causing the second electronic control unit to control the motor based on the second data when an abnormality has occurred in the first communication line, it is possible to control the motor accompanied by communication between the first electronic control unit and the second electronic control unit even when a data volume transmittable from the first electronic control unit to the second electronic control unit is limited.

In the motor system, the first data may be data of a first number of bits of a torque command value for the motor. The second data may be data of a second number of bits in which change rate data based on a rate of change of the torque command value and command value data based on the torque command value are combined.

In the motor system, the second electronic control unit may be configured to set a control torque at respective times using the change rate data included in the second data and the command value data included in the second data. The second electronic control unit may be configured to control the motor using the control torque.

In the motor system, the second electronic control unit may be configured to convert the command value data into the torque command value. The second electronic control unit may be configured to select one map from a plurality of maps indicating modes of change of the control torque over time based on the change rate data. The second electronic control unit may be configured to set the control torque at the respective times based on the map, the torque command value in a current routine, the torque command value in a previous routine, and an elapsed time after the second data has been received. With this configuration, it is possible to more appropriately control the motor.

In the motor system, the motor may be a traveling motor for a vehicle. The motor, the first electronic control unit, and the second electronic control unit may be mounted in the vehicle. The second electronic control unit may be configured to control the motor by communication via the second communication line such that the vehicle travels when the abnormality has occurred in the first communication line. With this configuration, it is possible to perform traveling in a limp-home mode.

A second aspect of the disclosure is a control method for a motor system. The motor system includes a motor, a first electronic control unit, a second electronic control unit, a first communication line, and a second communication line. The first electronic control unit is configured to generate a control command for the motor. The second electronic control unit is configured to communicate with the first electronic control unit and to control the motor. The first communication line connects the first electronic control unit to the second electronic control unit. The second communication line connects the first electronic control unit and the second electronic control unit to at least one third electronic control unit. The control method includes: transmitting, by the first electronic control unit, first data of the control command to the second electronic control unit via the first communication line when an abnormality has not occurred in the first communication line; controlling, by the second electronic control unit, the motor based on the first data after the second electronic control unit has received the first data from the first electronic control unit; generating, by the first electronic control unit, second data based on the control command and to transmit the second data to the second electronic control unit via the second communication line when the abnormality has occurred in the first communication line, a data volume of the second data is less a data volume of the first data; and controlling, by the second electronic control unit, the motor based on the second data after the second electronic control unit has received the second data from the first electronic control unit.

With this configuration, since the second communication line is connected to at least one third electronic control unit in addition to the first electronic control unit and the second electronic control unit and a load thereof is likely to become higher than that of the first communication line, a data volume transmittable is generally limited. Accordingly, by causing the first electronic control unit to generate second data based on the control command and to transmit the second data to the second electronic control unit via the second communication line and causing the second electronic control unit to control the motor based on the second data when an abnormality has occurred in the first communication line, it is possible to control the motor accompanied by communication between the first electronic control unit and the second electronic control unit even when a data volume transmittable from the first electronic control unit to the second electronic control unit is limited.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the disclosure will be described using an embodiment of the disclosure.

Figure 1:
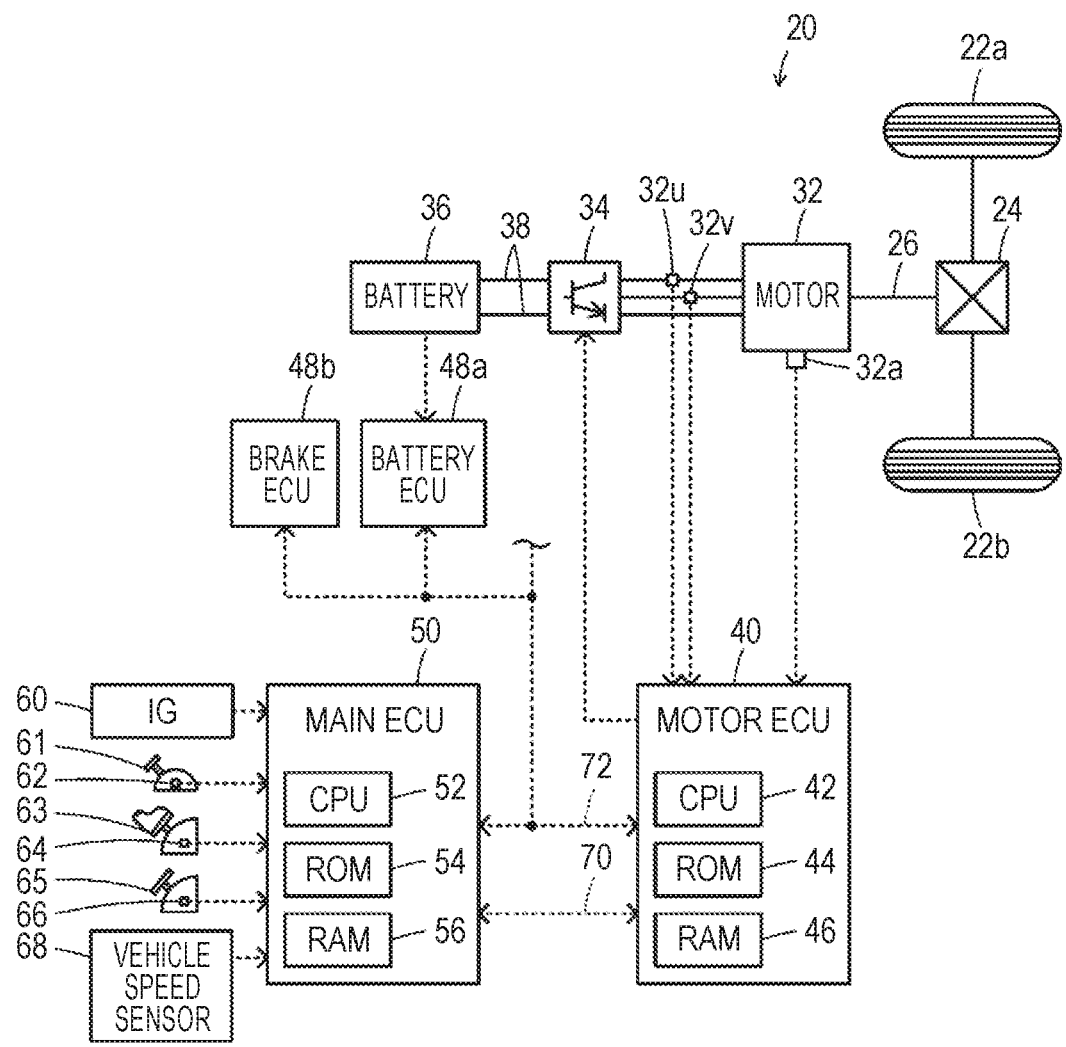
FIG. 1 is a diagram schematically illustrating a configuration of an electric vehicle 20 in which a controller for a motor according to an embodiment of the disclosure is mounted.

FIG. 1 is a diagram schematically illustrating a configuration of an electric vehicle 20 in which a controller for a motor according to an embodiment of the disclosure is mounted. As illustrated in the drawing, the electric vehicle 20 includes a motor 32, an inverter 34, a battery 36 serving as a power storage device, a motor electronic control unit (hereinafter referred to as a "motor ECU") 40, and a main electronic control unit (hereinafter referred to as a "main ECU") 50. In this embodiment, the motor ECU 40 and the main ECU 50 correspond to a "controller for a motor."

The motor 32 is constituted, for example, by a synchronous generator motor, and a rotor thereof is connected to a drive shaft 26 which is connected to driving wheels 22a and 22b via a differential gear 24. The inverter 34 is used to drive the motor 32 and is connected to the battery 36 via a power line 38. The motor 32 is rotationally driven by causing the motor ECU 40 to control switching of a plurality of switching elements of the inverter 34. The battery 36 is constituted, for example, by a lithium-ion secondary battery or a nickel-hydride secondary battery.

The motor ECU 40 is constituted by a microprocessor such as a CPU 42, and includes a ROM 44 that stores a processing program, a RAM 46 that temporarily stores data, input and output ports, and a communication port in addition to the CPU 42. A rotational position $\theta m$ from a rotational position sensor 32a that detects a rotational position of the rotor of the motor 32 or phase currents Iu and Iv from current sensors 32u and 32v that detect currents flowing by phases in the motor 32 is input to the motor ECU 40 via the input port. A switching control signal to the plurality of switching elements of the inverter 34 and the like are output from the motor ECU 40 via the output port. The motor ECU 40 is connected to the main ECU 50 via a first communication line (a local line) 70 and is connected to a second communication line (a global line) 72 along with various ECUs such as the main ECU 50, a battery electronic control unit (hereinafter referred to as a "battery ECU") 48a, and a brake electronic control unit (hereinafter referred to as a "brake ECU") 48b. The battery ECU 48a is an ECU that controls the battery 36, and the brake ECU 48b is an ECU that controls a hydraulic brake device (not illustrated) that applies a hydraulic braking force to the driving wheels 22a and 22b or driven wheels which are not illustrated.

The main ECU 50 is constituted by a microprocessor such as a CPU 52, and includes a ROM 54 that stores a processing program, a RAM 56 that temporarily stores data, input and output ports, and a communication port in addition to the CPU 52. Signals from various sensors are input to the main ECU 50 via the input port. Examples of the signals input to the main ECU 50 include a voltage Vb of the battery 36 from a voltage sensor 36a that is attached between the terminals of the battery 36 and a current Ib of the battery 36 from a current sensor 36b that is attached to the output terminal of the battery 36. Examples thereof include an ignition signal from an ignition switch 60 and a shift position SP from a shift position sensor 62 that detects an operation position of a shift lever 61. Examples thereof further include an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68. As described above, the main ECU 50 is connected to the motor ECU 40 via the first communication line 70 and is also connected to the second communication line 72 along with various ECUs such as the motor ECU 40, the battery ECU 48a, and the brake ECU 48b.

Figure 2:
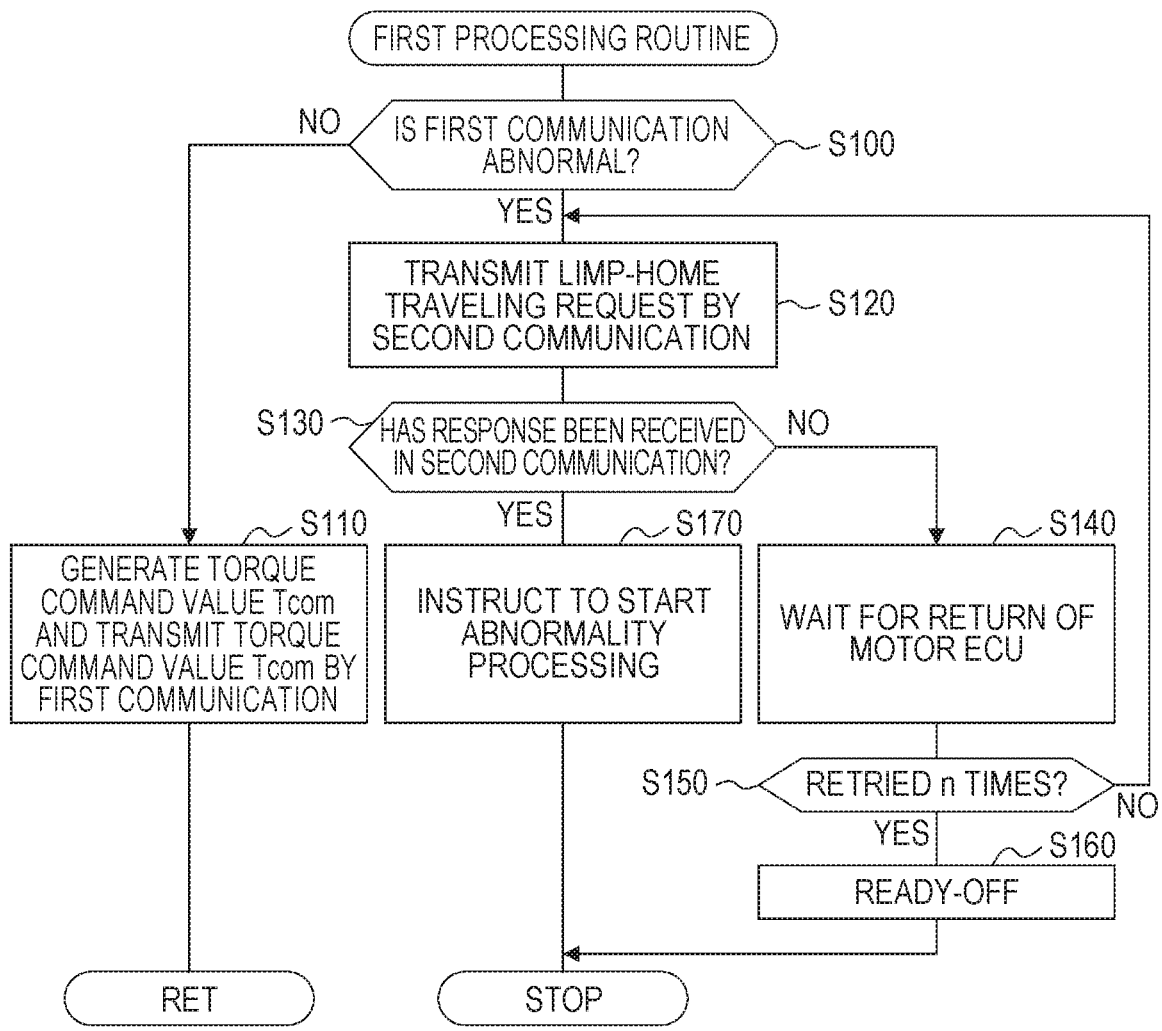
FIG. 2 is a flowchart illustrating an example of a first processing routine which is performed by a main ECU 50.

Operations of the electric vehicle 20 according to the embodiment having the above-mentioned configuration, particularly, processing routines which are performed by the main ECU 50 and the motor ECU 40, will be described below. The processing routine of the main ECU 50 and the processing routine of the motor ECU 40 will be sequentially described below. FIG. 2 is a flowchart illustrating an example of a first processing routine which is performed by the main ECU 50. This routine is repeatedly performed when an abnormality has not occurred in the first communication line 70.

In the following description, communication between the motor ECU 40 and the main ECU 50 via the first communication line 70 is referred to as "first communication" and communication between the motor ECU 40 and the main ECU 50 via the second communication line 72 is referred to as "second communication." In the second communication, data is transmitted between more ECUs and a load thereof is likely to be higher than that in the first communication. Accordingly, in the second communication, generally, a data volume transmittable is limited or a communication period is extended in comparison with the first communication.

When the first processing routine illustrated in FIG. 2 is performed, the main ECU 50 first determines whether an abnormality has occurred in the first communication line 70 (Step S100). This determination process is performed, for example, by determining whether the first communication with the motor ECU 40 is cut off over a predetermined time (for example, 1 sec, 1.2 sec, or 1.5 sec).

When it is determined in Step S100 that an abnormality has not occurred in the first communication line 70, the main ECU 50 generates a torque command value Tcom for the motor 32, transmits the generated torque command value Tcom for the motor 32 to the motor ECU 40 by the first communication (Step S110), and then ends this routine.

In the embodiment, the torque command value Tcom for the motor 32 is constituted as data of 16 bits (2 bytes). Generation of the torque command value Tcom for the motor 32 is performed by setting a required torque Td* required for the drive shaft 26 based on the accelerator operation amount Acc from the accelerator pedal position sensor 64 and the vehicle speed V from the vehicle speed sensor 68 and setting the set required torque Td* as the torque command value Tcom for the motor 32. When the torque command value Tcom for the motor 32 is received from the main ECU 50 through a second processing routine which will be described later, the motor ECU 40 controls driving of the motor 32 using the torque command value Tcom.

When it is determined in Step S100 that an abnormality has occurred in the first communication line 70, the main ECU 50 transmits a limp-home traveling request to the motor ECU 40 by the second communication (Step S120). When the limp-home traveling request is received from the main ECU 50 by the second communication through the second processing routine which will be described later, the motor ECU 40 transmits a response signal to the limp-home traveling request via the first communication line 70 by the second communication. Then, the main ECU 50 determines whether a response signal has been received from the motor ECU 40 by the second communication (Step S130).

When it is determined in Step s130 that a response signal has not been received from the motor ECU 40 by the second communication, the main ECU 50 determines that there is a likelihood that the motor ECU 40 stops or restarts (Step S140), and waits until a time required for return of the motor ECU 40 (for example, 0.8 sec, 1.0 sec, or 1.2 sec) elapses (Step S140). Then, the main ECU 50 determines whether transmission of the limp-home traveling request to the motor ECU 40 by the second communication has been retried n times (for example, two times, three times, or four times) (Step S150).

When it is determined in Step S150 that transmission of the limp-home traveling request to the motor ECU 40 by the second communication has not been retried n times, the main ECU 50 returns the routine to Step S120. On the other hand, when it is determined that transmission of the limp-home traveling request to the motor ECU 40 by the second communication has been retried n times, the main ECU 50 performs READY-OFF (Step S160) and then ends this routine.

When it is determined in Step S130 that a response signal has been received from the motor ECU 40 by the second communication, the main ECU 50 instructs to start execution of abnormality processing (Step S170) and then ends this routine. When it is instructed to start execution of abnormality processing in this way, the main ECU 50 starts repeated execution of a first abnormality processing routine illustrated in FIG. 3.

Figure 3:
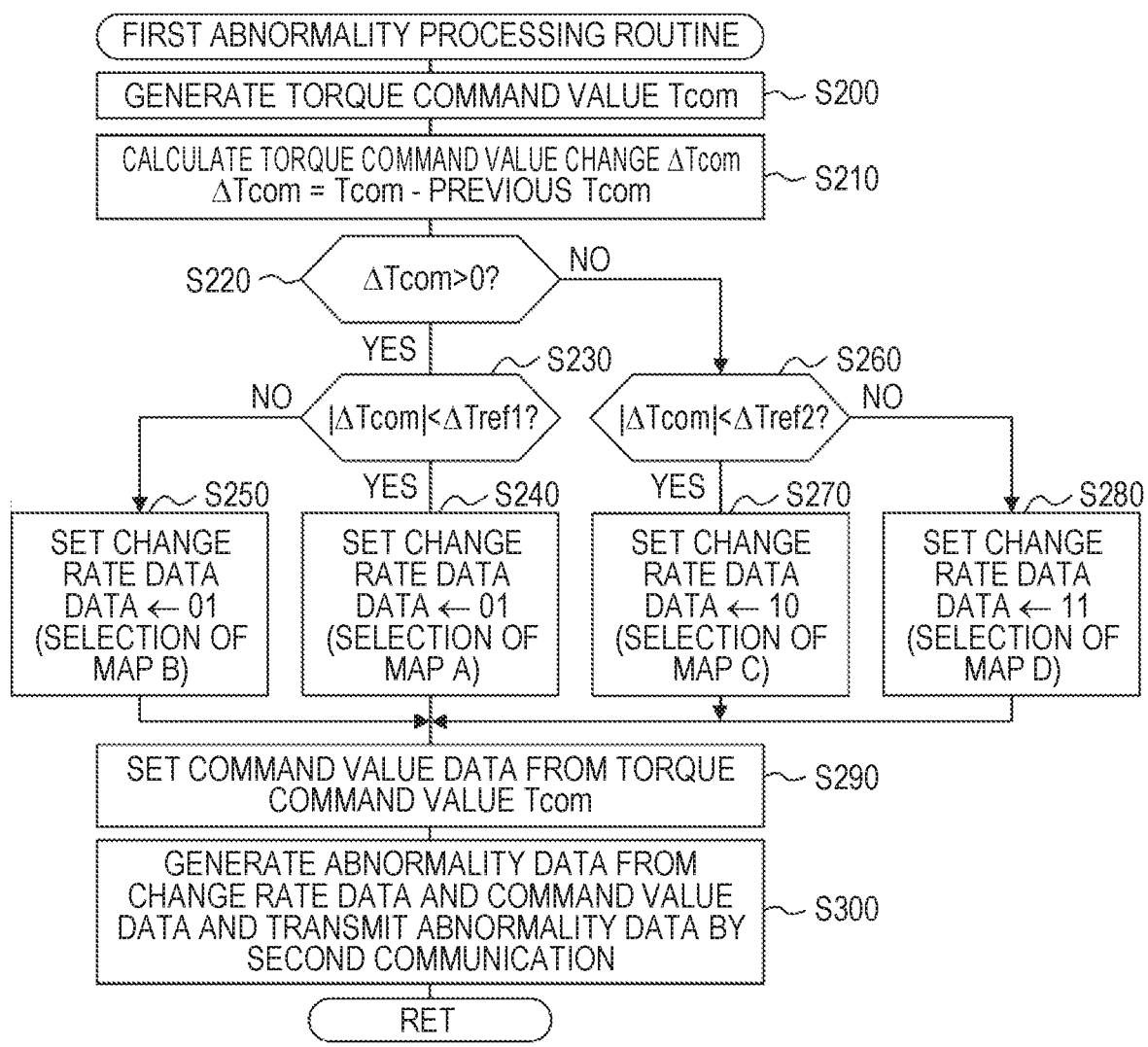
FIG. 3 is a flowchart illustrating an example of a first abnormality processing routine which is performed by the main ECU 50.

When the first abnormality processing routine illustrated in FIG. 3 is performed, the main ECU 50 first generates a torque command value Tcom for the motor 32 (Step S200) similarly to the process of Step S110 in the first processing routine illustrated in FIG. 2. Subsequently, the main ECU 50 calculates a torque command value change ΔTcom by subtracting the previous torque command value Tcom from the current torque command value Tcom for the motor 32 (Step S210).

Figure 4:
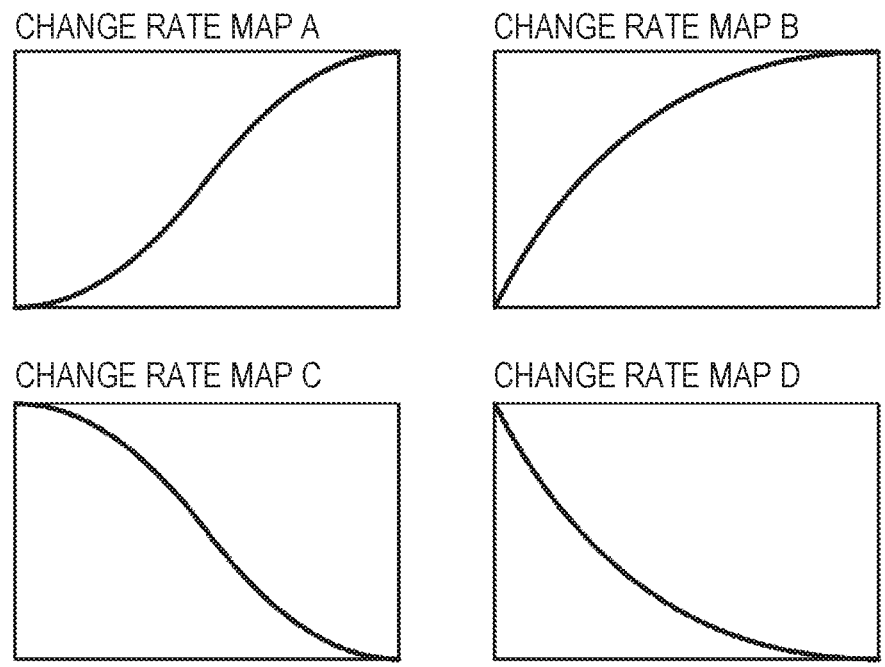
FIG. 4 is a diagram illustrating an example of four change rate maps A to D which are used to set change rate data.

Then, the main ECU 50 sets change rate data based on the torque command value change ΔTcom (Steps S220 to S280). In this embodiment, the change rate data is constituted as data of 2 bits. FIG. 4 is a diagram illustrating examples of four change rate maps A to D which are used to set the change rate data. The four change rate maps A to D are maps representing modes of change of a control torque Tm* over time which is used for the motor ECU 40 to control the motor 32 and are stored in the ROM 44 of the motor ECU 40. Change rate data corresponding to the four change rate maps is stored in the ROM 54 of the main ECU 50. In the process of setting change rate data, it is determined which change rate map of the four change rate maps A to D illustrated in FIG. 4 can be appropriately selected as the mode of change of the control torque Tm* for the motor 32 based on the torque command value change ΔTcom, and change rate data corresponding to the selected change rate map is set. This process will be specifically described below.

First, the main ECU 50 compares the torque command value change ΔTcom with a value of 0 (Step S220), determines that the torque command value Tcom has increased when the torque command value change ΔTcom is greater than the value of 0, and compares the absolute value of the torque command value change ΔTcom with a threshold value ΔTref1 (Step S230). Here, the threshold value ΔTref1 is a threshold value which is used to determine whether the torque command value Tcom for the motor 32 has increased relatively large and, for example, 25 Nm, 30 Nm, or 35 Nm is used.

When it is determined in Step S230 that the absolute value of the torque command value change ΔTcom is less than the threshold value ΔTref1, the main ECU 50 determines that the change rate map A in which the control torque Tm* for the motor 32 increases slowly can be appropriately selected, and sets change rate data ("00" in 2 bits) corresponding to the change rate map A (Step S240).

When it is determined in Step S230 that the absolute value of the torque command value change ΔTcom is equal to or greater than the threshold value ΔTref1, the main ECU 50 determines that the change rate map B in which the control torque Tm* for the motor 32 increases rapidly can be appropriately selected, and sets change rate data ("01" in 2 bits) corresponding to the change rate map B (Step S250).

When it is determined in Step S220 that the torque command value change ΔTcom is equal to or less than the value of 0, the main ECU 50 determines that the torque command value Tcom does not increase and compares the absolute value of the torque command value change ΔTcom with a threshold value ΔTref2 (Step S260). Here, the threshold value ΔTref2 is a threshold value which is used to determine whether the torque command value Tcom for the motor 32 has decreased relatively large and, for example, 25 Nm, 30 Nm, or 35 Nm is used.

When it is determined in Step S260 that the absolute value of the torque command value change ΔTcom is less than the threshold value ΔTref2, the main ECU 50 determines that the change rate map C in which the control torque Tm* for the motor 32 decreases slowly can be appropriately selected, and sets change rate data ("10" in 2 bits) corresponding to the change rate map C (Step S270).

When it is determined in Step S260 that the absolute value of the torque command value change ΔTcom is equal to or greater than the threshold value ΔTref2, the main ECU 50 determines that the change rate map D in which the control torque Tm* for the motor 32 decreases rapidly can be appropriately selected, and sets change rate data ("11" in 2 bits) corresponding to the change rate map D (Step S280).

Figure 5:
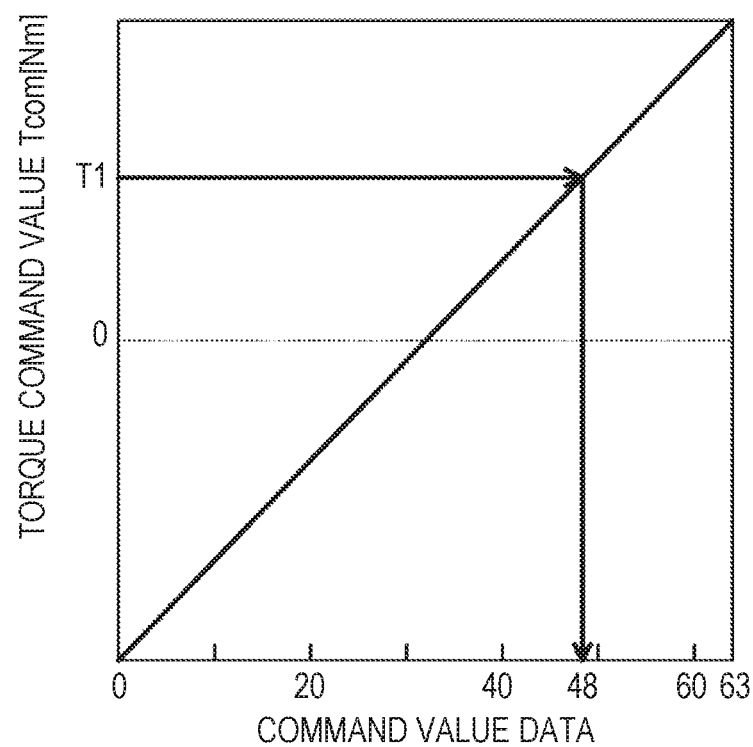
FIG. 5 is a diagram illustrating an example of a relationship between a torque command value Tcom for a motor 32 and command value data.

When the change rate data is set in this way, the main ECU 50 sets command value data from the torque command value Tcom for the motor 32 (Step S290). In this embodiment, the command value data is constituted as data of 6 bits. FIG. 5 is a diagram illustrating an example of a relationship between the torque command value Tcom for the motor 32 and the command value data. In the process of setting the command value data, the main ECU 50 converts the torque command value Tcom for the motor 32 into command value data, that is, converts data of 65536 phases (16 bits) into data of 64 phases (6 bits), by applying the torque command value Tcom for the motor 32 to the map illustrated in FIG. 5. For example, as illustrated in FIG. 5, the main ECU 50 sets the command value data to 48 ("110000" in 6 bits) when the torque command value Tcom for the motor 32 is a value Ti.

Then, the main ECU 50 combines the change rate data (data of 2 bits) and the command value data (data of 6 bits) to generate abnormality data (data of 8 bits), transmits the generated abnormality data to the motor ECU 40 by the second communication (Step S300), and ends this routine. When abnormality data is received from the main ECU 50 through the second processing routine which will be described later, the motor ECU 40 controls driving of the motor 32 using the abnormality data.

Figure 6:
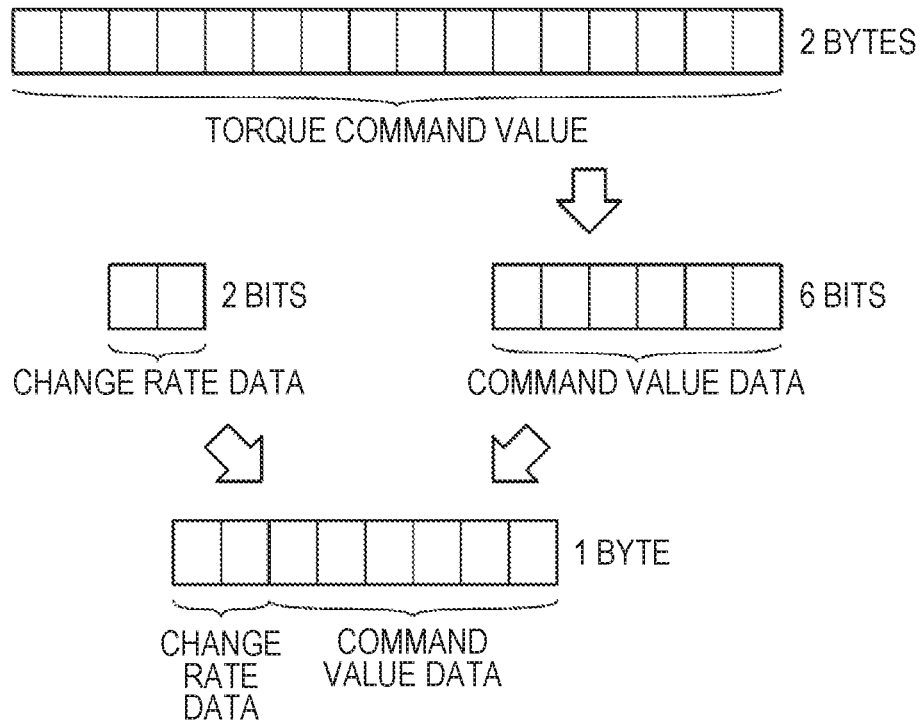
FIG. 6 is a diagram illustrating an example of preparation of abnormality data.

FIG. 6 is a diagram illustrating an example of preparation of abnormality data. In this embodiment, as illustrated in FIG. 6, the data size (1 byte) of abnormality data can be set to half the data size (2 bytes) of the torque command value Tcom for the motor 32.

Figure 7:
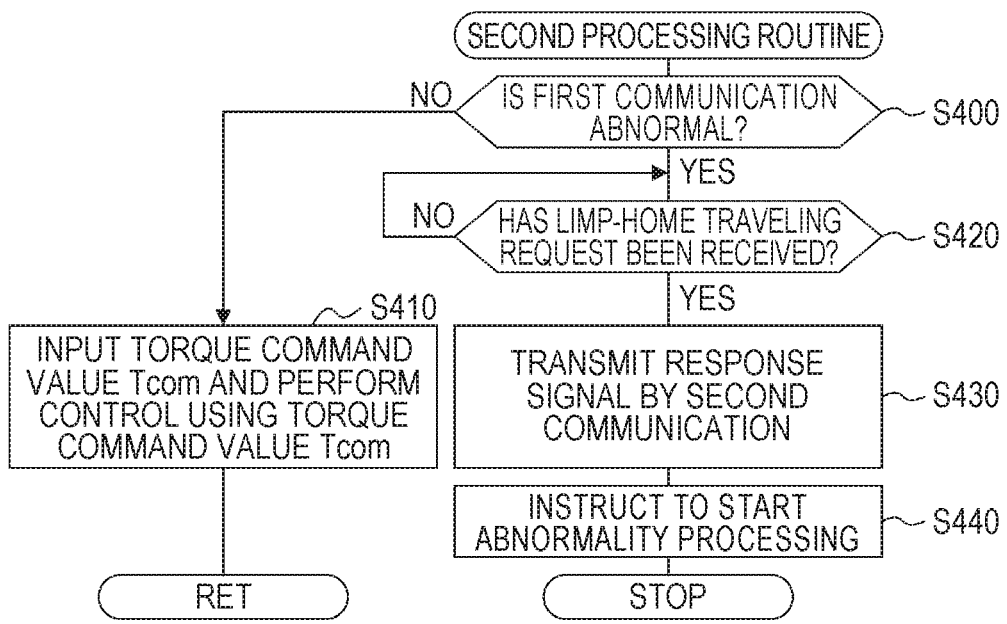
FIG. 7 is a flowchart illustrating an example of a second processing routine which is performed by a motor ECU 40.

Processes which are performed by the main ECU 50 have been described above. Processes which are performed by the motor ECU 40 will be described now. FIG. 7 is a flowchart illustrating an example of a second processing routine which is performed by the motor ECU 40. This routine is repeatedly performed when an abnormality has not occurred in the first communication line 70.

When the second processing routine illustrated in FIG. 7 is performed, the motor ECU 40 first determines whether an abnormality has occurred in the first communication line 70 (Step S400). This determination process is performed, for example, by determining whether the first communication with the main ECU 50 is cut off over a predetermined time (for example, 1 sec, 1.2 sec, or 1.5 sec).

When it is determined in Step S400 that an abnormality has not occurred in the first communication line 70, the motor ECU 40 receives an input of a torque command value Tcom for the motor 32 received from the main ECU 50 by the first communication, controls driving of the motor 32 by controlling switching of the plurality of switching elements of the inverter 34 such that the motor 32 is driven with the torque command value Tcom (Step S410), and then ends this routine.

When it is determined in Step S400 that an abnormality has occurred in the first communication line 70, the motor ECU 40 determines whether a limp-home traveling request has been received from the main ECU 50 by the second communication (Step S420), and waits until a limp-home traveling request is received when it is determined that a limp-home traveling request has not been received by the second communication.

When it is determined in Step S420 that a limp-home traveling request has been received from the main ECU 50 by the second communication, as described above, the motor ECU 40 transmits a response signal to the limp-home traveling request to the main ECU 50 by the second communication (Step S430), instructs to start execution of abnormality processing (Step S440), and then ends this routine. When it is instructed to start execution of abnormality processing in this way, the motor ECU 40 starts repeated execution of a second abnormality processing routine illustrated in FIG. 8.

Figure 8:
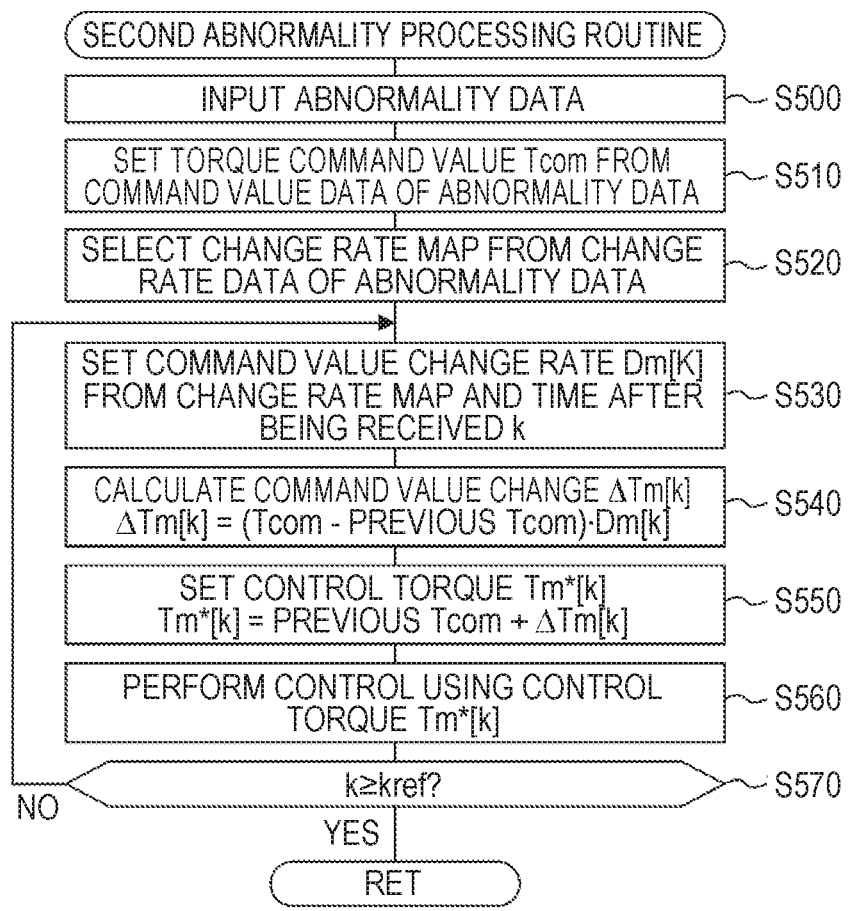
FIG. 8 is a flowchart illustrating an example of a second abnormality processing routine which is performed by the motor ECU 40.

When the second abnormality processing routine illustrated in FIG. 8 is performed, the motor ECU 40 first receives an input of abnormality data received from the main ECU 50 by the second communication (Step S500), and sets the torque command value Tcom for the motor 32 from command value data included in the input abnormality data (Step S510). In the process of setting the torque command value Tcom for the motor 32, the motor ECU 40 converts the command value data into the torque command value Tcom for the motor 32 using the map illustrated in FIG. 5. For example, when the command value data is 48, the motor ECU 40 sets the torque command value Tcom for the motor 32 to a value T 1. Since the main ECU 50 converts a torque command value Tcom for the motor 32 (data of 16 bits) into command value data (data of 6 bits) and the motor ECU 40 converts command value data into a torque command value Tcom for the motor 32, the torque command value Tcom for the motor 32 in the main ECU 50 and the torque command value Tcom for the motor 32 in the motor ECU 40 may be different from each other.

Subsequently, the motor ECU 40 selects a change rate map from change rate data included in the abnormality data (Step S520). As described above, four change rate maps A to D are stored in the ROM 44 of the motor ECU 40 (see FIG. 4). Accordingly, in the process of selecting a change rate map, the motor ECU 40 selects the change rate map corresponding to the change rate data (data of 2 bits) from the four change rate maps A to D.

Figure 9:
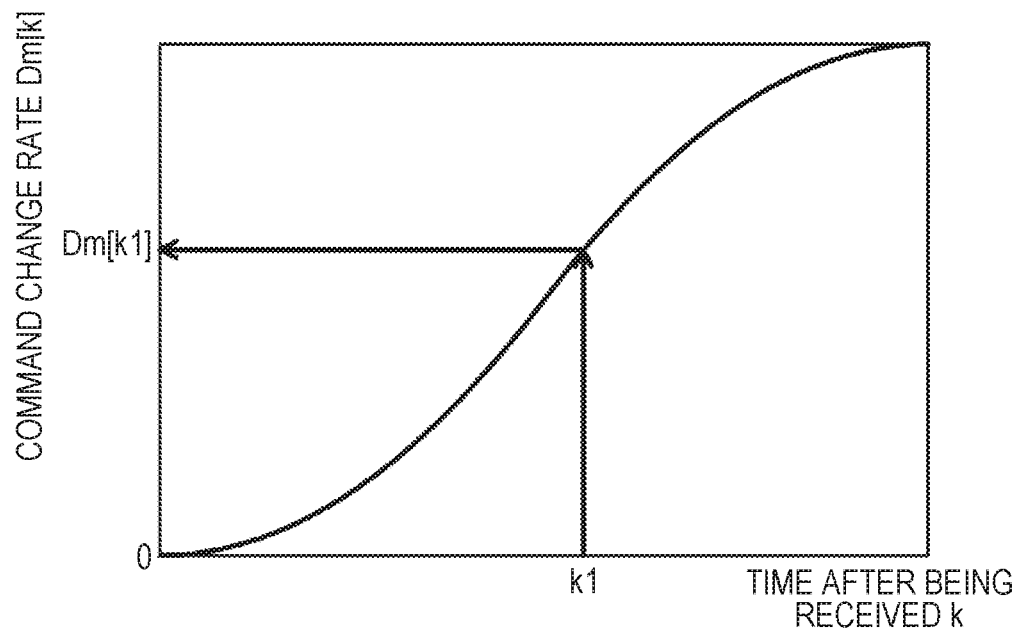
FIG. 9 is a diagram illustrating an example of a process of setting a command value change rate Dm[k]

Then, the motor ECU 40 sets a command value change rate Dm[k] based on the selected change rate map and an elapsed time (hereinafter referred to as a "time after being received") after the abnormality data has been received (Step S530). FIG. 9 is a diagram illustrating an example of the process of setting the command value change rate Dm[k]. In FIG. 9, a state in which the change rate map A in FIG. 4 has been selected is illustrated. In the process of setting the command value change rate Dm[k], the motor ECU 40 sets the command value change rate Dm[k] by applying the time after being received k to the selected change rate map (the change rate map A in FIG. 9). For example, as illustrated in FIG. 9, when the time after being received k is a value k1, the motor ECU 40 sets the command value change rate Dm[k] to a value Dm[k1].

When the command value change rate Dm[k] is set in this way, the motor ECU 40 calculates a command value change $\Delta Tm[k]$ by multiplying the command value change rate Dm[k] by a value obtained by subtracting the previous torque command value (previous Tcom) from the current torque command value Tcom for the motor 32 as expressed by Equation (1) (Step S540). Subsequently, as expressed by Equation (2), the motor ECU 40 sets the control torque Tm* by adding the command value change $\Delta Tm[k]$ to the previous torque command value (previous Tcom) for the motor 32 (Step S550). Then, the motor ECU 40 controls driving of the motor 32 by controlling switching of the plurality of switching elements of the inverter 34 such that the motor 32 is driven with the control torque Tm* (Step S560).

$$\Delta Tm[k] = (Tcom - \text{previous } Tcom) \cdot Dm[k] \quad (1)$$

$$Tm^*[k] = \text{previous } Tcom + \Delta Tm[k] \quad (2)$$

Then, the motor ECU 40 compares the time after being received k with a communication period kref between the main ECU 50 and the motor ECU 40 via the second communication line 72 (Step S570), and returns the routine to Step S530 when the time after being received k is less than the communication period kref. In this way, the processes of Steps S530 to S570 are repeatedly performed, and this routine ends when it is determined in Step S570 that the time after being received becomes equal to or greater than the communication period kref.

Figure 10:
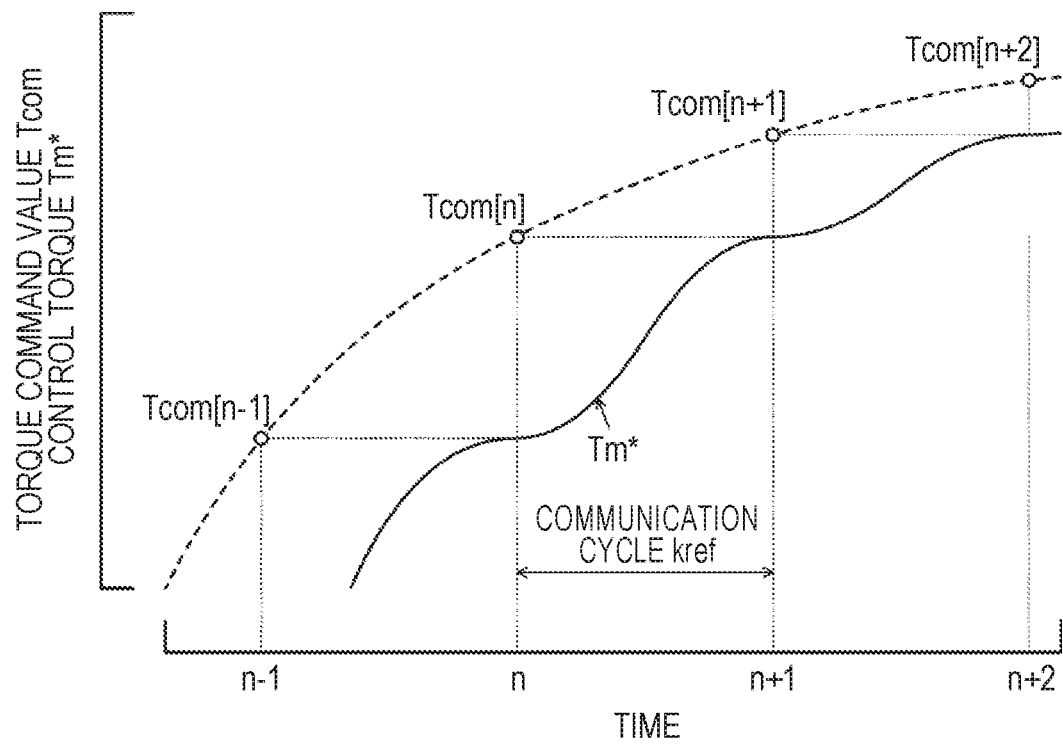
FIG. 10 is a diagram illustrating an example of a mode of change of a torque command value Tcom and a control torque Tm* for the motor 32 over time in the motor ECU 40 when the main ECU 50 performs the first abnormality processing routine illustrated in FIG. 3 and the motor ECU 40 performs the second abnormality processing routine illustrated in FIG. 8.

FIG. 10 is a diagram illustrating an example of a mode of change of the torque command value Tcom and the control torque Tm* for the motor 32 over time in the motor ECU 40 when the main ECU 50 performs the first abnormality processing routine illustrated in FIG. 3 and the motor ECU 40 performs the second abnormality processing routine illustrated in FIG. 8. In the drawing, "n−1," "n," "n+1," and "n+2" represent times at which the motor ECU 40 receives abnormality data from the main ECU 50, and "Tcom[n−1]," "Tcom[n]," "Tcom[n+1]," and "Tcom[n+2]" represent torque command values Tcom for the motor 32 based on the command value data included in the abnormality data received at times n−1, n, n+1, and n+2. In the drawing, a dotted line represents an approximate curve of the torque command value Tcom for the motor 32 at respective times. By causing the main ECU 50 to perform the first abnormality processing routine illustrated in FIG. 3 and causing the motor ECU 40 to perform the second abnormality processing routine illustrated in FIG. 8, the control torque Tm* for the motor 32 can be made to follow the torque command value Tcom as illustrated in FIG. 10. Accordingly, when data is transmitted from the main ECU 50 the motor ECU 40 via the second communication line 72 (when the transmittable data volume is limited to be less than the data volume (16 bits) of the torque command value Tcom for the motor 32), it is possible to cause the motor ECU 40 to control the motor 32 by transmitting the abnormality data (data of 8 bits) from the main ECU 50 to the motor ECU 40. As a result, it is possible to enable traveling in a limp-home mode when an abnormality has occurred in the first communication line 70.

In the above-mentioned controller for a motor which is mounted in the electric vehicle 20 according to the embodiment, the motor ECU 40 and the main ECU 50 are connected to each other via the first communication line 70 and are also connected to the second communication line 72 along with various ECUs such as the battery ECU 48a and the brake ECU 48b. When an abnormality has not occurred in the first communication line 70, the main ECU 50 transmits a torque command value Tcom for the motor 32 (data of 16 bits) to the motor ECU 40 via the first communication line 70, and the motor ECU 40 controls driving of the motor 32 based on the torque command value Tcom for the motor 32. On the other hand, when an abnormality has occurred in the first communication line 70, the main ECU 50 generates abnormality data (data of 8 bits) having a data volume less than that of the torque command value Tcom based on the torque command value Tcom for the motor 32 and transmits the generated abnormality data to the motor ECU 40 via the second communication line 72, and the motor ECU 40 controls driving of the motor 32 based on the abnormality data. Through these processes, even when the data volume transmittable from the main ECU 50 to the motor ECU 40 is limited to be less than the data volume (16 bits) of the torque command value Tcom for the motor 32, it is possible to cause the motor ECU 40 to control the motor 32 by transmitting abnormality data (data of 8 bits) from the main ECU 50 to the motor ECU 40. As a result, it is possible to enable traveling in a limp-home mode when an abnormality has occurred in the first communication line 70.

Figure 11:
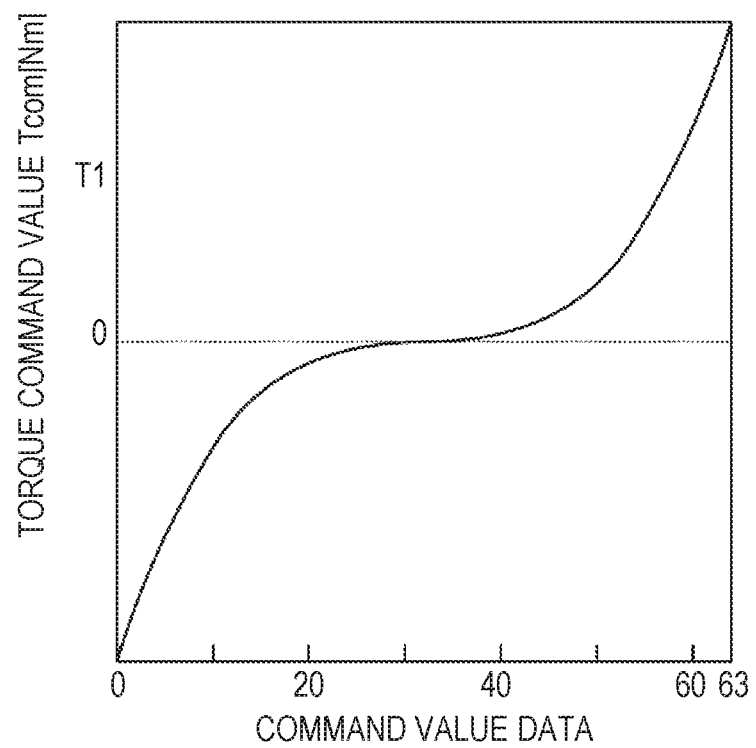
FIG. 11 is a diagram illustrating an example of a relationship between a torque command value Tcom for a motor 32 and command value data in a modified example.

In the controller for a motor which is mounted in the electric vehicle 20 according to the embodiment, a map in which the torque command value Tcom and the command value data have a linear relationship is used as a map representing a relationship between the torque command value Tcom for the motor 32 and the command value data as illustrated in FIG. 5, but a map in which the torque command value Tcom and the command value have a nonlinear relationship may be used. FIG. 11 is a diagram illustrating an example of a relationship between the torque command value Tcom for a motor 32 and the command value data in a modified example. In FIG. 11, when the torque command value Tcom for the motor 32 changes in a range in which the absolute value is relatively small (a range around zero), the torque command value Tcom for the motor 32 can be accurately converted into the command value data.

In the controller for a motor which is mounted in the electric vehicle 20 according to the embodiment, the torque command value Tcom for the motor 32 is constituted as data of 16 bits, the change rate data is constituted as data of 2 bits, and the command value data is constituted as data of 6 bits, but the constitution is not limited thereto and the sum of the numbers of bits of the change rate data and the command value data (the number of bits of the abnormality data) has only to be less than the number of bits of the torque command value Tcom for the motor 32. For example, when the torque command value Tcom for the motor 32 is constituted as data of 16 bits, the change rate data may be constituted as data of 3 bits and the command value data may be constituted as data of 5 bits.

In the controller for a motor which is mounted in the electric vehicle 20 according to the embodiment, the main ECU 50 transmits the limp-home traveling request to the motor ECU 40 by the second communication only one time when an abnormality in the first communication line 70 is detected, but may transmit the limp-home traveling request continuously a predetermined number of times N1 such as three times, five times, or seven times. In this case, when an abnormality in the first communication line 70 has been detected and the limp-home traveling request has been received from the main ECU 50 by the second communication continuously a predetermined number of times N1, the motor ECU 40 can transmit a response signal to the limp-home traveling request to the main ECU 50. The motor ECU 40 transmits the response signal to the main ECU 50 by the second communication only one time, but may transmit the response signal continuously a predetermined number of times N2 such as three times, five times, or seven times. In this case, when the response signal has been received from the motor ECU 40 by the second communication continuously a predetermined number of times N2, the main ECU 50 can start execution of the abnormality processing (repeated execution of the first abnormality processing routine illustrated in FIG. 3).

In the embodiment, the controller for a motor which is mounted in the electric vehicle 20 including the motor 32 is provided. However, a controller for a motor which is mounted in a hybrid vehicle including an engine in addition to the motor 32 may be embodied, a controller for a motor which is mounted in a moving object such as a vehicle other than an automobile, a ship, or an aircraft may be embodied, or a controller for a motor which is mounted in a facility which does not move such as a construction facility may be embodied.

Correspondence between principal elements of the embodiment and principal elements of the disclosure described in the SUMMARY will be described below. In the embodiment, the motor ECU 40 is an example of a "first electronic control unit," the main ECU 50 is an example of a second "electronic control unit," the first communication line 70 is an example of a "first communication line," and the second communication line 72 is an example of a "second communication line."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noted that the disclosure described in the SUMMARY has to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to manufacturing industries for a controller for a motor.

What is claimed is:

1. A motor system comprising:
   a motor;
   a first electronic control unit configured to generate a control command for the motor;
   a second electronic control unit configured to communicate with the first electronic control unit and to control the motor;
   a first communication line that connects the first electronic control unit to the second electronic control unit; and
   a second communication line that connects the first electronic control unit and the second electronic control unit to at least one third electronic control unit,
   the first electronic control unit being configured to transmit first data of the control command to the second electronic control unit via the first communication line when an abnormality has not occurred in the first communication line, the second electronic control unit being configured to control the motor based on the first data after the first data has been received from the first electronic control unit, and
   the first electronic control unit being configured to generate second data based on the control command and to transmit the second data to the second electronic control unit via the second communication line when the abnormality has occurred in the first communication line, a data volume of the second data being less than a data volume of the first data, the second electronic control unit being configured to control the motor based on the second data after the second data has been received from the first electronic control unit.

2. The motor system according to claim 1, wherein the first data is data of a first number of bits of a torque command value for the motor, and
   the second data is data of a second number of bits in which change rate data based on a rate of change of the torque command value and command value data based on the torque command value are combined.

3. The motor system according to claim 2, wherein the second electronic control unit is configured to set a control torque at respective times using the change rate data included in the second data and the command value data included in the second data, and the second electronic control unit is configured to control the motor using the control torque.

4. The motor system according to claim 3, wherein
the second electronic control unit is configured to convert the command value data into the torque command value,
the second electronic control unit is configured to select one map from a plurality of maps indicating modes of change of the control torque over time based on the change rate data, and
the second electronic control unit is configured to set the control torque at the respective times based on the selected map, the torque command value in a current routine, the torque command value in a previous routine, and an elapsed time after the second data has been received.

5. The motor system according to claim 1, wherein
the motor is a traveling motor for a vehicle,
the motor, the first electronic control unit, and the second electronic control unit are mounted in the vehicle, and
the second electronic control unit is configured to control the motor by communication via the second communication line such that the vehicle travels when the abnormality has occurred in the first communication line.

6. A control method for a motor system,
the motor system including a motor, a first electronic control unit, a second electronic control unit, a first communication line, and a second communication line,
the first electronic control unit being configured to generate a control command for the motor,
the second electronic control unit being configured to communicate with the first electronic control unit and to control the motor,
the first communication line connecting the first electronic control unit to the second electronic control unit,
the second communication line connecting the first electronic control unit and the second electronic control unit to at least one third electronic control unit,
the control method comprising:
  transmitting, by the first electronic control unit, first data of the control command to the second electronic control unit via the first communication line when an abnormality has not occurred in the first communication line;
  controlling, by the second electronic control unit, the motor based on the first data after the second electronic control unit has received the first data from the first electronic control unit;
  generating, by the first electronic control unit, second data based on the control command and to transmit the second data to the second electronic control unit via the second communication line when the abnormality has occurred in the first communication line, a data volume of the second data being less than a data volume of the first data; and
  controlling, by the second electronic control unit, the motor based on the second data after the second electronic control unit has received the second data from the first electronic control unit.

* * * * *